(12) United States Patent
Sundberg

(10) Patent No.: US 7,625,749 B2
(45) Date of Patent: Dec. 1, 2009

(54) GARDEN COMPOSTER

(75) Inventor: Henric Sundberg, Burlington (CA)

(73) Assignee: Sun-Mar Corporation, Burlington (CA)

( * ) Notice: Subject to any disclaimer, the term of this patent is extended or adjusted under 35 U.S.C. 154(b) by 649 days.

(21) Appl. No.: 11/097,329

(22) Filed: Apr. 4, 2005

(65) Prior Publication Data

US 2006/0154362 A1  Jul. 13, 2006

(51) Int. Cl.
*C12M 1/02* (2006.01)
*C12M 1/10* (2006.01)

(52) U.S. Cl. .............. 435/290.3; 435/290.4; 366/226; 366/228; 366/234

(58) Field of Classification Search ............. 435/290.1, 435/290.2, 290.3, 290.4, 291.1, 291.7, 291.8; 220/4.09; 366/220, 223, 226, 234, 235; 142/10; 144/131; 175/325.3
See application file for complete search history.

(56) References Cited

U.S. PATENT DOCUMENTS

| | | | |
|---|---|---|---|
| 466,671 A * | 1/1892 | Gale | 366/220 |
| 1,787,897 A * | 1/1931 | Durnin | 241/72 |
| 2,160,169 A * | 5/1939 | Pontoppidan | 241/72 |
| 3,837,810 A | 9/1974 | Richards et al. | |
| 3,890,129 A * | 6/1975 | Chester | 71/9 |
| 3,966,415 A | 6/1976 | Chester | |
| 4,125,394 A | 11/1978 | Wilson | |
| 5,047,349 A * | 9/1991 | Eweson | 435/290.3 |
| 5,118,005 A | 6/1992 | Onodera | |
| 5,300,438 A * | 4/1994 | Augspurger et al. | 435/290.3 |
| 5,322,793 A | 6/1994 | Yarnell | |
| 5,589,388 A | 12/1996 | Hanhikoski | |
| 5,589,391 A | 12/1996 | Fink | |
| 5,605,834 A * | 2/1997 | Eberthson et al. | 435/290.3 |

FOREIGN PATENT DOCUMENTS

CH  684269 A5  8/1994

(Continued)

OTHER PUBLICATIONS

Machine translation of DE 38 19 979 A1.*

(Continued)

*Primary Examiner*—William H Beisner
*Assistant Examiner*—Michael Hobbs
(74) *Attorney, Agent, or Firm*—Alexander Ross, Esq.; Steven M. Greenberg, Esq.; Carey, Rodriguez, Greenberg & Paul, LLP

(57) ABSTRACT

A garden composter has a longitudinally extending cylindrical drum which is mounted to a support frame and can be rotated relative to the support frame about an axis of rotation of the drum. The drum has at least two load openings formed in a cylindrical wall portion between two end wall portions and removable closure caps for selectively closing the load openings. At least one partition divides the drum into a number of chambers disposed side by side along the longitudinal axis. Each chamber communicates with a respective load opening. The partition has a fixed portion coupled to the drum and a relatively movable portion. Each portion has at least one flow control partition opening and the movable portion can be moved so that its associated flow control partition opening may be selectively brought into and out of registration with corresponding flow control partition openings in the fixed portion.

10 Claims, 8 Drawing Sheets

FOREIGN PATENT DOCUMENTS

| | | | |
|---|---|---|---|
| DE | 3626480 | C1 | 9/1987 |
| DE | 3819979 | A1 | 8/1989 |
| DE | 3819979 | A1 * | 10/1989 |
| EP | 0179362 | A2 | 4/1986 |
| EP | 0210382 | A1 | 2/1987 |
| JP | 11110988 | A | 5/1986 |

OTHER PUBLICATIONS

Machine translation of DE 38 19 979 A1 (translation created Mar. 31, 2008),*

* cited by examiner

FIG. 5 (two chambers, one process)

FIG. 6 (single chamber being used)

FIG. 7 (double chamber being used for two processes)

GARDEN COMPOSTER

FIELD OF THE INVENTION

This invention relates to a garden composter for household use. The composter is intended to be located outdoors where it may conveniently be loaded with organic plant material from a garden and which may be supplemented with vegetable waste from the kitchen for decomposition, optionally with organic accelerators, to provide compost material for use in the garden to enrich the soil and feed plants.

BACKGROUND OF THE INVENTION

For various reasons, gardeners will find it desirable to use composted organic material in their gardens. Conveniently, while supplementing the nutritional content of the soil, the gardener can take advantage of a composter to dispose of kitchen and garden waste in an ecological manner and exercise control over the nature of the fertilizers used in the garden. Such composting may be carried out simply by digging a hole in the garden and adding material to be decomposed to the hole. In order to create conditions which are favourable to decomposition, it is desirable for the composting hole to be covered so as to contain heat but also to provide access to the hole for regular mixing of the contents and for controlling moisture. Several container devices are known to provide such a controlled environment. The simplest form of such a container provides four side walls and a lid with bottom gates in the walls to access decomposed material at the bottom of the composter. In other cases, the container is closed and rotatably mounted in order to facilitate mixing of the contents as otherwise, this must be done manually, with the aid of garden tools.

Some tumbling composters are known in which the container is provided with a partition to divide the container into two compartments. An example of such a composter is described in U.S. Pat. No. 3,837,810. In another composter described in U.S. Pat. No. 5,589,388, the partition is movable in order to adjust the volume of the compartments. In both these composters, the dividing wall or partition is intended to separate the contents of one compartment from the other. Optionally perforations may be formed in the wall for aeration. Access to the compartments is provided by respective doors formed on the side of the container. The doors provide access to the compartments so that decomposed material may be withdrawn, for example, with the use of a trowel or a shovel.

One of the problems associated with known composters is that there is very limited flexibility for selectively aging the organic waste in the compartments to adjust its residence time before discharge from the composter. Another problem which has been identified is the difficulty in removing decomposed material from the composter so that it can be used to supplement the soil in the garden and also provide more space in the composter to receive additional organic waste for further decomposition. It will be understood that it is desirable to always maintain a small portion of aged material in the composter which will have the necessary microbial mass to aid decomposition of fresh material added to the composter.

SUMMARY OF THE INVENTION

In accordance with this invention, there is provided a garden composter for decomposing garden waste in which the composter has a longitudinally extending cylindrical drum which is mounted to a support frame which is adapted to space the drum from a supporting surface. Tumbling means are provided for coupling the drum to the support frame for rotation of the drum relative to the support frame about an axis of rotation of the drum. The drum has at least two load openings formed in a cylindrical wall portion between two end wall portions and removable closure caps for selectively closing the load openings. At least one partition is provided in the drum to divide the drum into a number of chambers disposed side by side along the longitudinal axis. Each chamber communicates with a respective load opening. The partition has a fixed portion which is coupled to the drum and a relatively movable portion. Each portion has at least one flow control partition opening and the movable portion can be moved so that its associated flow control partition opening may be selectively brought into and out of registration with corresponding flow control partition openings in the fixed portion. In this way, the garden composter can receive organic waste through the load openings for decomposition in the chambers and the waste can be aged selectively in the chambers to adjust its residence time before being discharged from the composter.

In a preferred embodiment of the invention, the cylindrical drum has discharge openings formed in the end wall portions for discharging composted material. This configuration allows the discharge of compost material to be high enough above ground to fall into a wheel barrow for convenient removal and distribution in the garden while providing a convenient loading height for fresh material being added to the composter.

BRIEF DESCRIPTION OF THE DRAWINGS

In order that the invention may be better understood, a preferred embodiment is described below with reference to the accompanying drawings, in which.

DESCRIPTION OF PREFERRED EMBODIMENT

Figure 1:
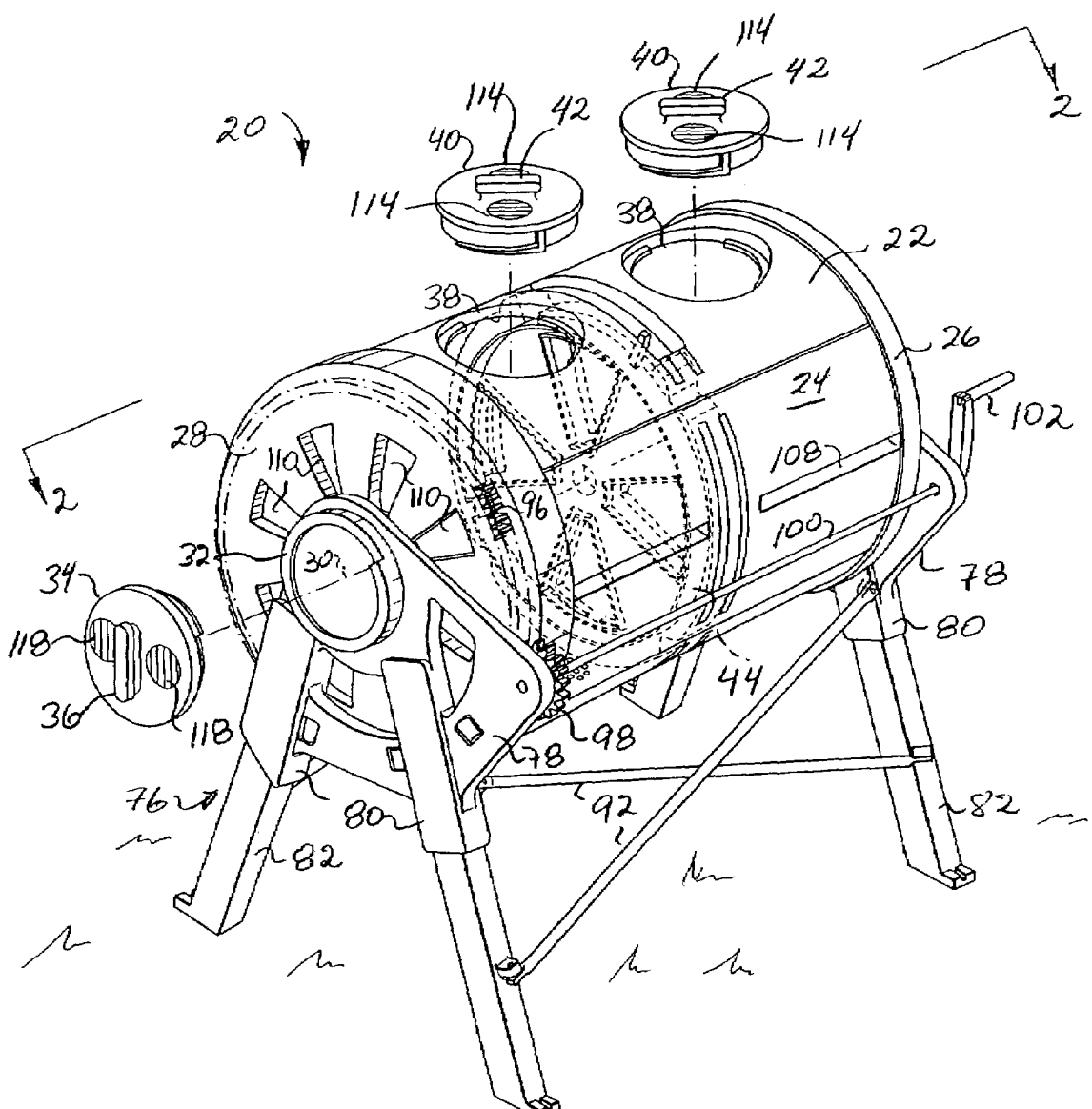
FIG. 1 is a perspective view showing a preferred embodiment of a composter made in accordance with the invention.

A composter according to the invention is generally indicated in the accompanying drawings by reference numeral 20. The composter 20 has a longitudinally extending cylindrical drum 22 which has a cylindrical wall portion 24 constructed from four modular panels which are joined together along their lengths. The cylindrical wall portion 24 extends between two end wall portions 26, 28 about a longitudinal axis 30. The end wall portions 26, 28 each have a respective outwardly extending trunnion 32 formed on the longitudinal axis and defining a discharge opening through which composted material may be discharged from the composter 20. It will be seen from the drawings that trunnions 30 have a threaded wall and this is adapted to cooperate with a similar thread provided on a closure cap 34 for each trunnion 32. Conveniently, the closure cap 34 has a grip 36 for releasing the closure cap from the trunnion 30.

The drum 22 also has two load openings 38 formed in the cylindrical wall portion 24 and disposed side by side between the end wall portions 26, 28. As in the case the trunnions 32, the load openings 38 have respective closure caps 40 with threaded ends for closing the load openings 38. Each closure cap 40 has a respective grip portion 42.

Figure 2:
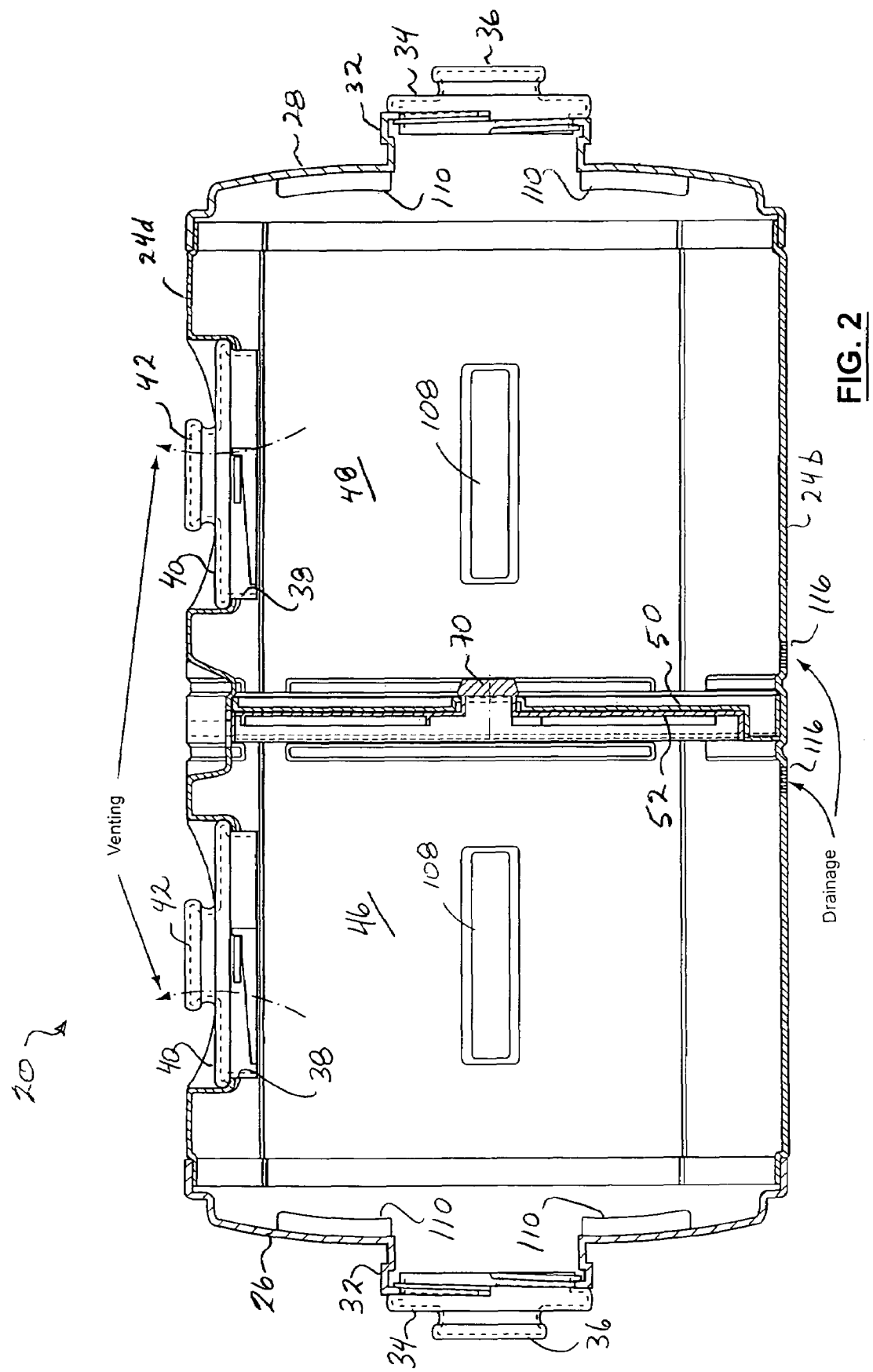
FIG. 2. is a cross-sectional view taken on line 2-2 of FIG. 1.

In the embodiment shown in the drawings, there is provided a single partition 44 which divides the drum 22 into two chambers disposed side by side on the longitudinal axis 30. For ease of reference, a first chamber will be identified in the drawings by reference numeral 46 (FIG. 2) and a second chamber by reference numeral 48. Each chamber 46, 48 communicates with a respective load opening 38 to receive fresh organic material.

Figure 3:
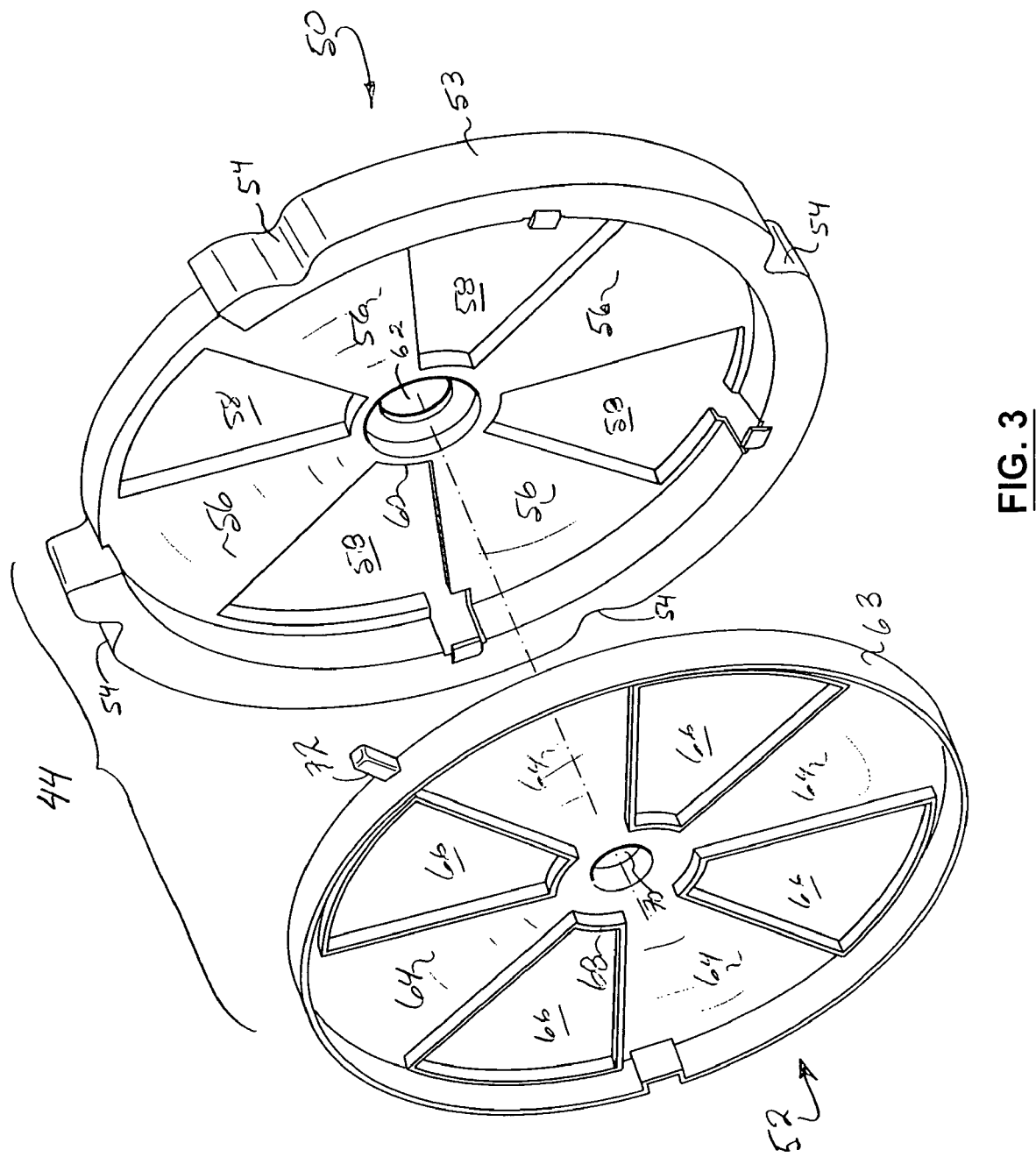
FIG. 3 is an exploded view of a partition forming part of the composter.
Figure 4:
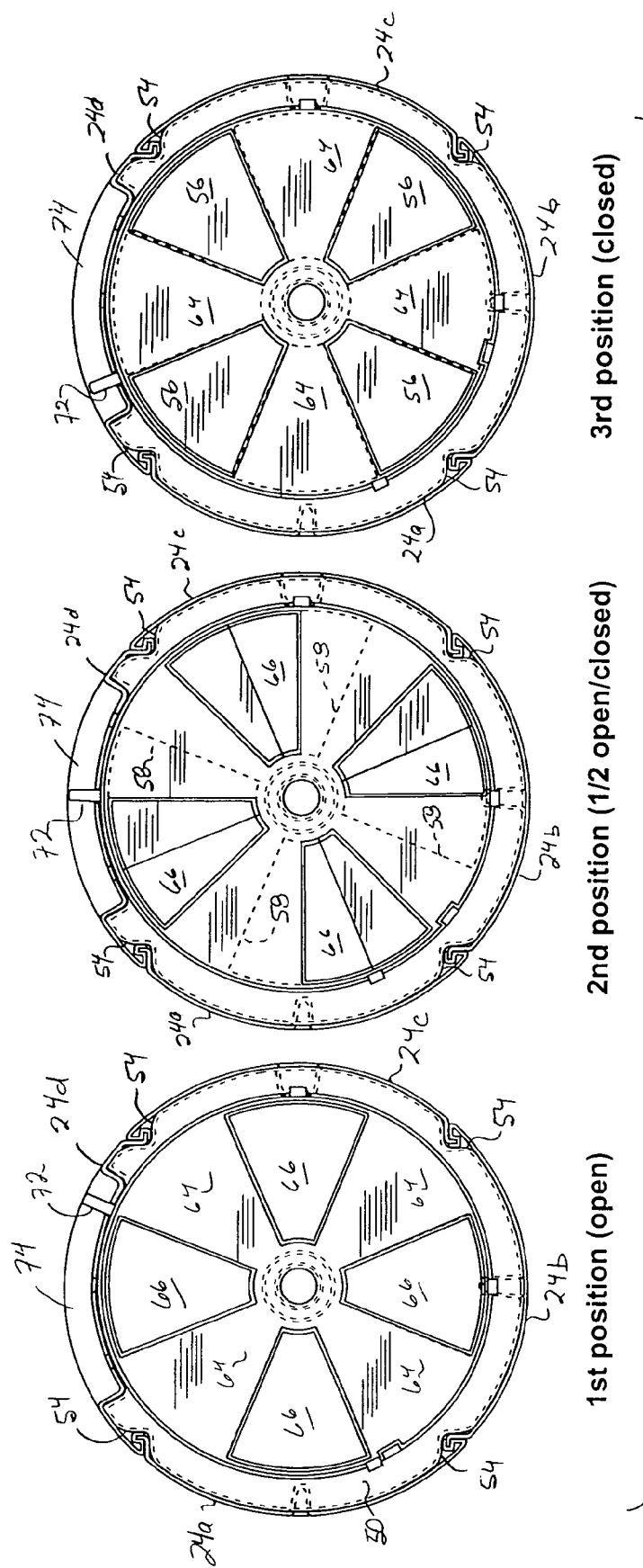
FIG. 4 is a plan view of the partition in three relative positions of a movable portion and a fixed portion forming part of the partition.

The construction of the partition 44 will best be understood with reference to FIGS. 3 and 4. It will be seen that the partition 44 is generally circular and has a fixed portion 50 which is coupled to the drum and a relatively movable portion 52. The fixed portion 50 has a peripheral rim portion 53 that has four recesses 54 which are radially displaced at 90□ from each other in order to receive and lock into the junction formed between the modular panel sections forming the cylindrical wall portion 24 (FIG. 4). To distinguish between the modular sections forming the cylindrical wall portions, they are identified by reference numeral 24a, b, c, d.

The rim portion 53 inscribes a planar wall 56 with four radially off-set sector shaped flow control partition openings 58 disposed about a central hub 60 that defines an aperture 62. The movable portion 52 has a rim 63 which nests inside the rim portion 53 of the fixed portion 50. Like the fixed portion 50, the movable portion 52 has a planar wall 64 and four sector-shaped flow control partition openings 66 which are radially offset from each at 90□ to leave wall portions in between and which, in use, will close the flow control partition openings 58 of the fixed portion 50 when they are brought into registration with each other as shown by the various positions illustrated in FIG. 4. The movable portion 52 has a central hub 68 which defines a closed outwardly extending projection 70 (FIG. 7) with a conical outer surface which allows it to be forced through the aperture 62 of the fixed portion 50 and which locks in position once assembled to the fixed portion.

In order to move the movable portion 52, it is provided with a handle 72 which extends radially from the rim 63 and through the cylindrical wall portion 24d of the drum 22. The panel forming the wall portion 24d has an arcuate slot 74 which receives the handle 72 and is disposed to lie in registration with the partition 44. The ends of the slot 74 define open and closed limit positions for the handle 72 in which the flow control partition openings 58, 66 are in registration and fully opened and in which the flow control partitions 58, 66 are out of registration and fully closed, respectively.

Figure 8:
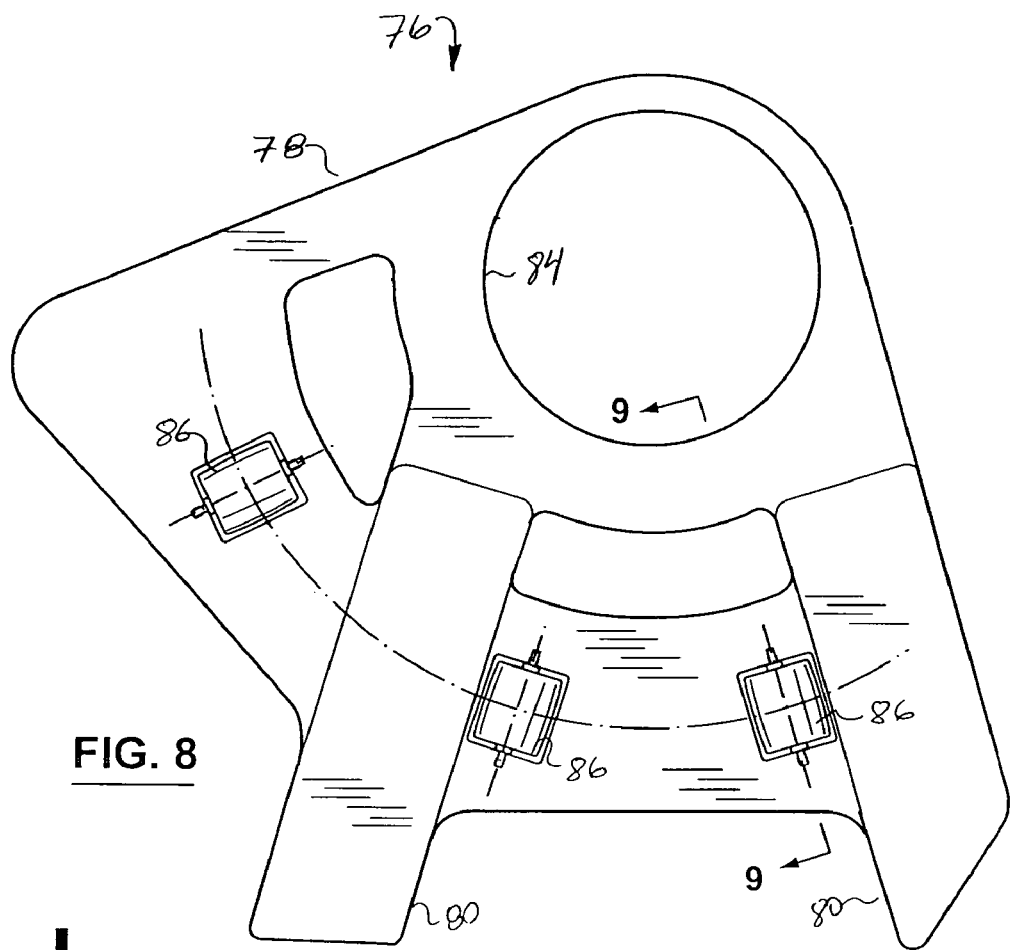
FIG. 8 is a plan view of a support frame used to support a drum forming part of the composter.

Returning to FIG. 1, it will be seen that the drum 22 is supported by a frame 76 so as to be spaced from a supporting surface illustrated in the drawing as grass. The frame 76 consists of a pair of bearing plates 78 (FIG. 8) disposed for location against the end wall portions 26, 28 at opposite ends of the drum 22. Each bearing plate 78 has a pair of converging leg sockets 80 for slidably receiving leg supports 82. Each bearing plate 78 has a cradle opening 84 dimensioned to receive a respective trunnion 32 and to support the drum 22 in sliding engagement with the trunnions 32.

Figure 9:
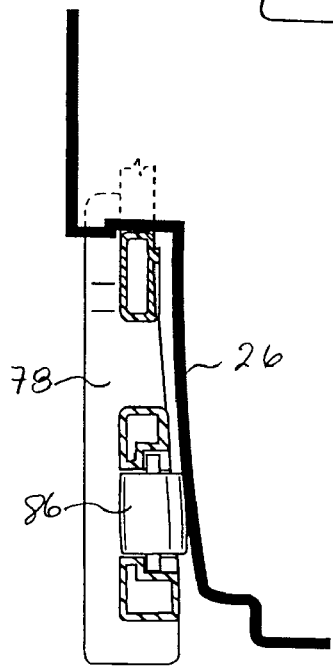
FIG. 9 is a cross-sectional view drawn on line 9-9 of FIG. 8 illustrating a roller bearing in rolling engagement with a drum end wall forming part of the composter.
Figure 10:
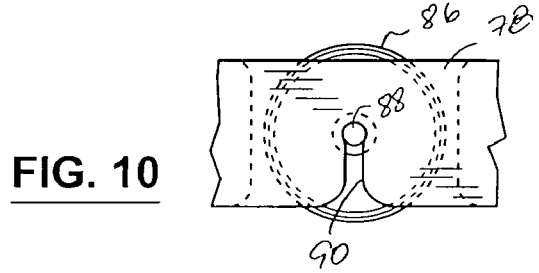
FIG. 10 (drawn to a larger scale) is an end on view of the roller bearing of FIG. 9.
Figure 11:
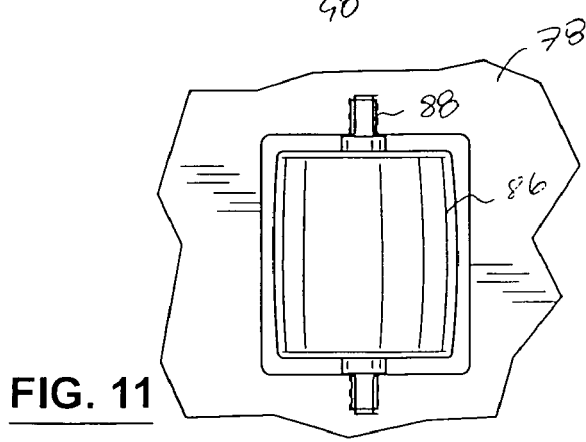
FIG. 11 (drawn to a larger scale) is a side view of the roller bearing of FIG. 9.

Each bearing plate 78 further includes three radially disposed roller bearings 86 which bear against the associated end wall portion 26, 28 for rolling engagement therewith and to maintain contact with the drum 22 so that it may be rotated without losing stability. The contact with an end wall 26 is shown in the detail view of FIG. 9. It will be seen that each roller bearing 86 is mounted on an axially disposed spindle 88 which slides into a receiving bracket 90 formed on an interior surface of the bearing plates 78 where it is captured between the plate and the end wall.

The bearing plates 78 and associated forward and trailing leg supports 82 are secured together by two pairs of braces 92 (only one of which is shown in FIG. 1). This arrangement of the brace pairs 92 serves to further stabilize the support frame 76.

Tumbling means 94 are provided for coupling the drum 22 to the support frame 76 for rotation of the drum relative to the support frame about the longitudinal axis 30. In the embodiment illustrated, the tumbling means consists of a toothed peripheral rim 96 formed at one end of the composting drum 22 and cooperating with a pinion wheel 98 at one end of a pinion shaft 100 which is rotatably mounted to the support frame 76 between the bearing plates 78. A handle 102 is provided at one end of the pinion shaft to facilitate rotation thereof and to allow the pinion wheel 98 to engage the toothed peripheral rim 96 for rotation of the drum 22.

Figure 5:
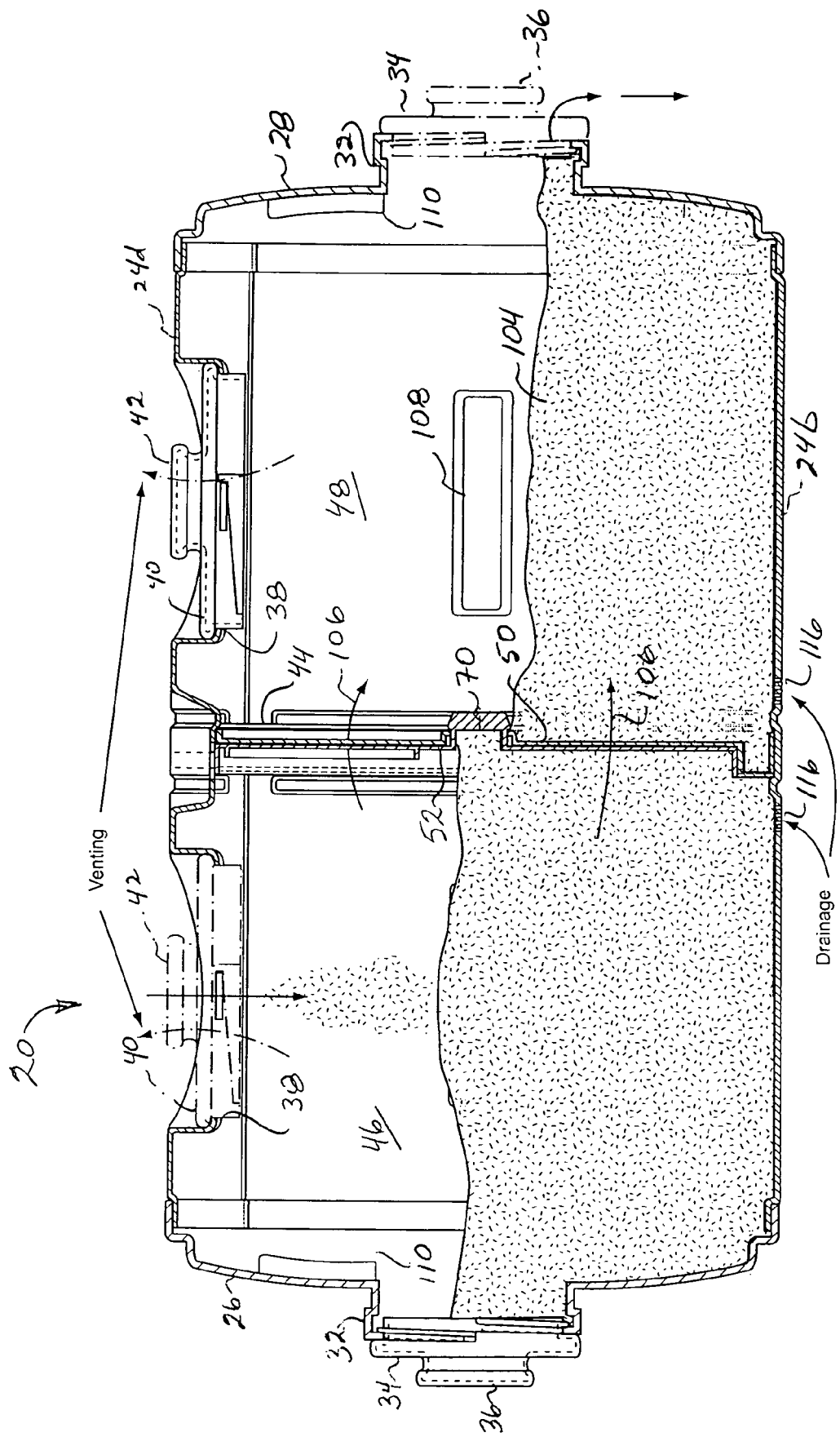
FIG. 5 is a similar view to FIG. 2 showing the distribution of the composted material between two adjacent chambers in the composter.
Figure 6:
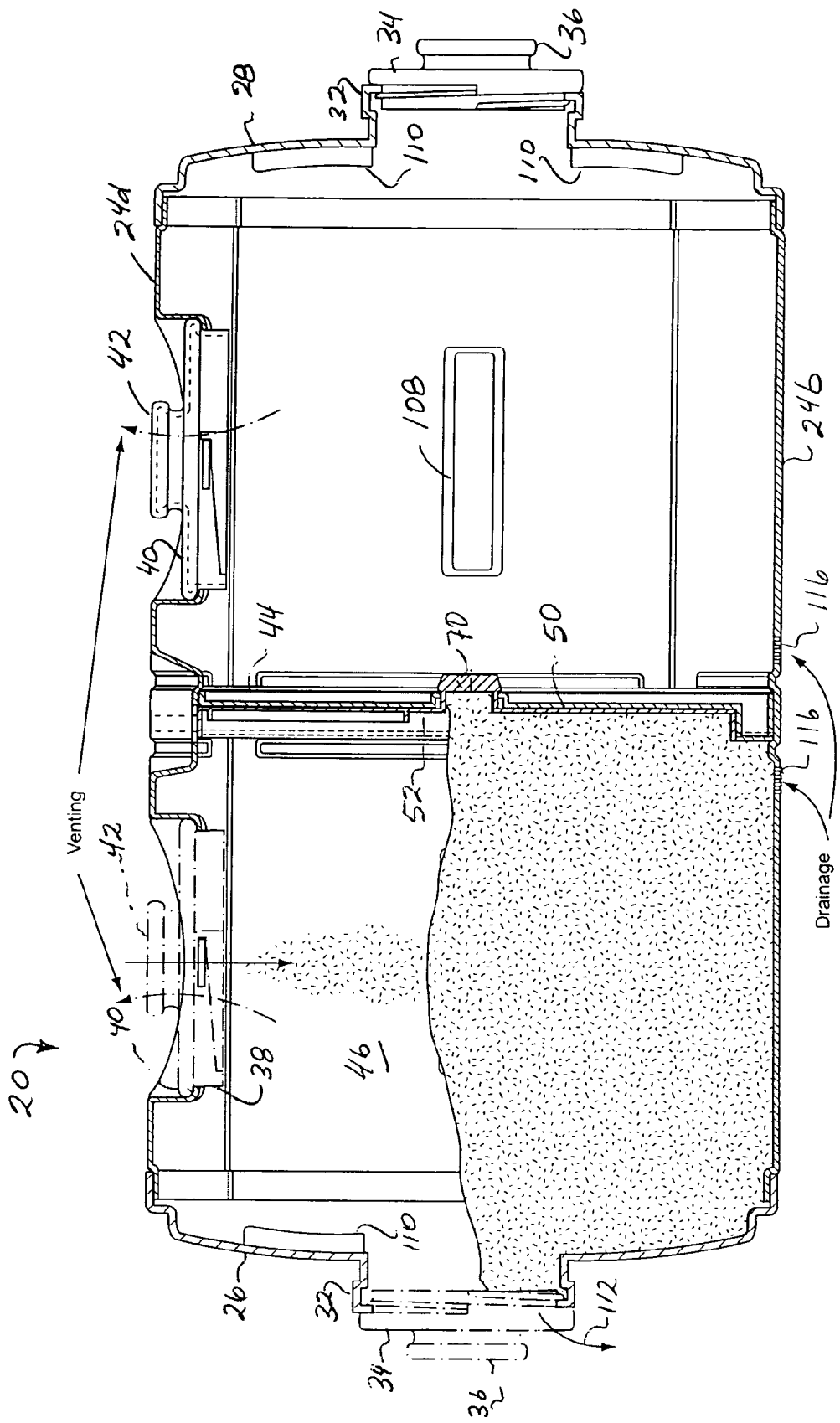
FIG. 6 is a similar view to FIG. 2 showing the discharge of composted material from a single compartment of the composter while a second compartment is not used.
Figure 7:
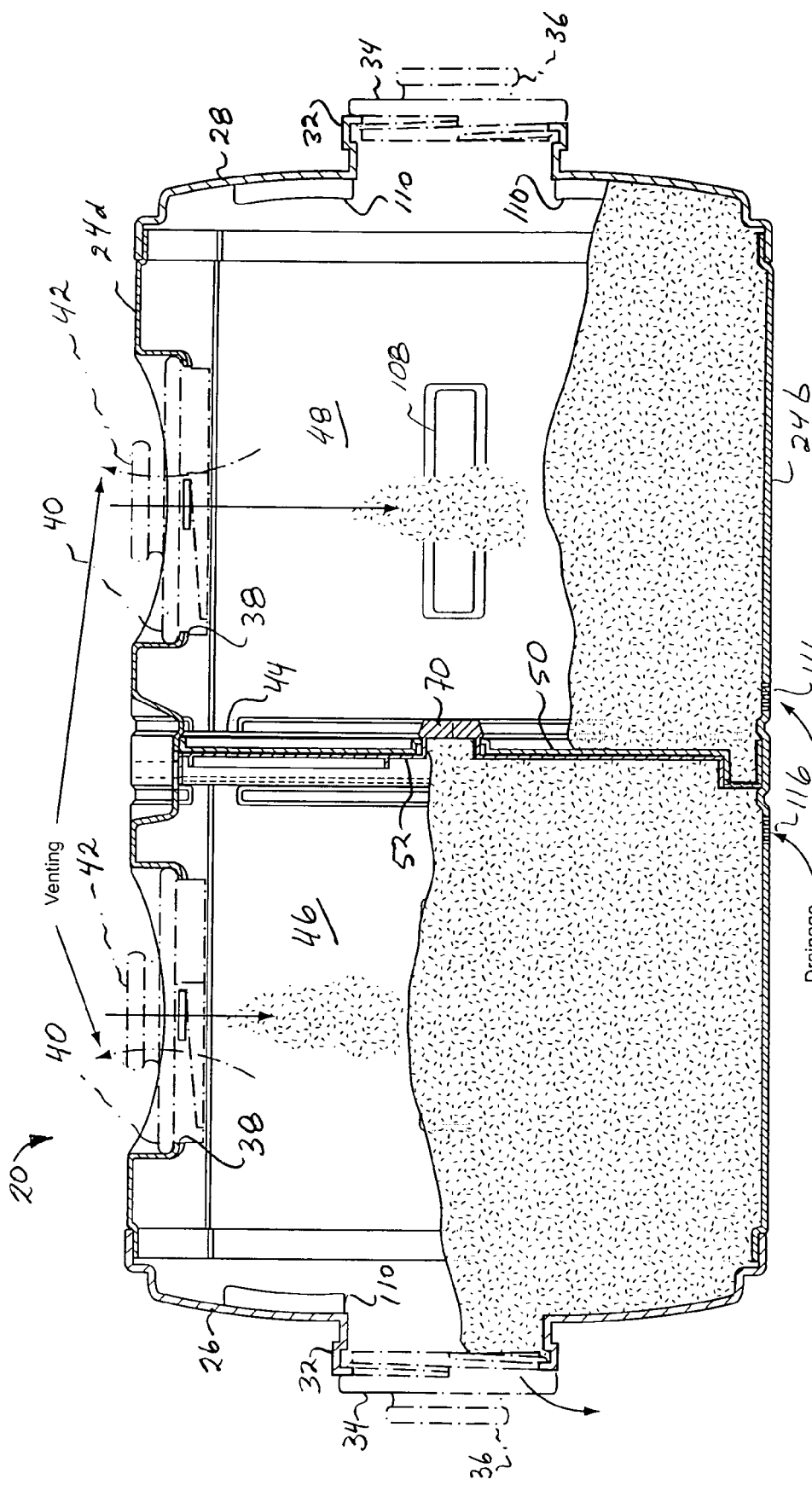
FIG. 7 is a similar view to FIG. 2 showing the composter with two compartments being used in parallel.

Use of the composter will be now described with particular reference being made to FIGS. 5, 6 and 7 of the accompanying drawings. In FIG. 5, it will be seen that fresh material for decomposition is added to the first chamber 46 where it accumulates until it reaches a depth which is sufficient for it to traverse through the open partition 44 into the second chamber 48 where it may be eventually discharged through the trunnion opening 32. In this way, the residence time of composted material 104 inside the drum 22 is prolonged in that the fresh material tends to reside in the first chamber 46 while the more aged material traverses the partition 44 to the second chamber 48. The flow of material from the first chamber to the second chamber occurs naturally by gravity as indicated by the directional arrows 106 and also occurs during rotation of the drum 22. Mixing of the material 104 is assisted in part by paddles 108 which are integrally formed on the interior surface of the panels forming the cylindrical wall portion 24. Additional paddles 110 are formed on the interior surface of the end wall portions 26, 28.

In some situations, a gardener may prefer to use only a single chamber, in which case, the movable portion of the partition 52 is rotated using the handle 72 to the closed position shown in FIG. 4 so that the openings 66, 58 are fully obstructed and there is no transfer of composted material 104 between the first chamber 46 and the second chamber 48. Such an arrangement is shown in FIG. 6 of the drawings. Once the material in the chamber 46 is sufficiently aged, the partition 44 may be opened by moving the handle 72 of the movable portion 52 to the half open position shown in FIG. 4 so as to gradually discharge some of the aged material into the second chamber 48 as shown in FIG. 5. Alternatively, if additional aging in the second chamber 48 is not required because ambient conditions are favourable for decomposition, the composted material 104 may simply be discharged through the trunnion opening 32 as indicated by directional arrow 112 in FIG. 6.

Still another way of using the composter 20 is to use both chambers 46, 48 in parallel with the partition 44 fully closed. This is illustrated by FIG. 7. A gardener may choose to do this, for example, where it is desirable to segregate materials which require different residence times for decomposition.

It will be appreciated that loading of the composter with fresh material is easily done by removing the closure caps from the load openings 38. Conveniently, the closure caps 40 are provided with aeration openings 114 and these will operate to drain the drum of excess moisture when oriented in a downward position. A drainage opening 116 is provided in each chamber 46, 48 on a side opposite from the closure caps 40 to supplement drainage. Additional drainage is also provided at the joints between the panels comprising the drum 22. Aeration openings 118 are also provided in the closure caps 34 for the trunnions 32. By providing the discharge openings in the trunnions 32, the discharge of composted material 104 occurs at the longitudinal axis of the drum and is significantly higher above the ground than the discharge opening would be if material were leaving through the load openings 38. Of course, the difference in height will be determined by the diameter of the drum and this will be a design consideration so that the discharge height will conveniently accommodate a wheel barrow for receiving decomposed material.

It will be understood that several variations, as will be apparent to those skilled in the art, may be made to the above described embodiment of the invention within the scope of the appended claims. It will be understood that the composter has been fabricated in a modular way in order to allow the panels to be nested and form a package which can be easily shipped. To facilitate such nesting, the depth and width of the paddles 108 of the different cylindrical wall portions 24a, b, c, d varies from panel to panel. In addition, the leg supports 82 are made in sections which telescope and are press fit and optionally held with fasteners. Such features are convenient choices of design which may be altered within the scope of the invention.

The invention claimed is:

1. A garden composter for decomposing organic waste, the garden composter having a longitudinally extending cylindrical drum for mounting to a support frame adapted to space the drum from a supporting surface and tumbling means for coupling the drum to the support frame for rotation of the drum relative to the support frame about an axis of rotation of the drum, the cylindrical drum having at least two load openings formed in a cylindrical wall portion thereof between two end wall portions;

removable closure caps for selectively closing said load openings; and at least one partition for dividing the cylindrical drum into a number of chambers disposed side by side along said axis, each chamber communicating with a respective load opening, the said at least one partition having a fixed portion coupled to the drum and a relatively movable portion, said fixed portion and said movable portion each having at least one flow control partition opening, said movable portion being adapted to be moved so that the associated said at least one flow control partition opening may be selectively brought into registration with a corresponding said at least one flow control partition opening in the fixed portion so that transfer of composted material between adjacent chambers is permitted and out of registration with a corresponding said at least one flow control partition opening in the fixed portion so that all of the at least one flow control partition opening are fully obstructed;

wherein the said at least one partition has a handle fixed to the movable portion and extending radially through the cylindrical wall portion for arcuate movement along the cylindrical wall portion of the drum, the drum having an arcuate slot for receiving the handle and disposed to lie in registration with said partition to define open and closed limit positions, in which the flow control partition openings are in registration and fully open and in which the flow control partition openings are out of registration and fully closed, respectively;

whereby the garden composter may receive organic waste through said load openings for decomposition in said chambers, and the waste may be aged selectively in said chambers to adjust its residence time, as required, before discharge from the composter.

2. A garden composter according to claim 1 in which the cylindrical drum has at least one discharge opening formed in an end wall portion thereof for discharging composted material from the drum.

3. A garden composter according to claim 2 in which the cylindrical drum has at least one discharge opening formed in both end wall portions at opposite ends of the drum for discharging composted material from the drum.

4. A garden composter according to claim 2 in which the said at least one discharge opening is formed to discharge composted material from a height above the supporting surface corresponding to the axis of rotation of the drum.

5. A garden composter for decomposing organic waste, the garden composter having a longitudinally extending cylindrical drum for mounting to a support frame adapted to space the drum from a supporting surface and tumbling means for coupling the drum to the support frame for rotation of the drum relative to the support frame about an axis of rotation of the drum, the cylindrical drum having at least two load openings formed in a cylindrical wall portion thereof between two end wall portions;

removable closure caps for selectively closing said load openings; and at least one partition for dividing the cylindrical drum into a number of chambers disposed side by side along said axis, each chamber communicating with a respective load opening, the said at least one partition having a fixed portion coupled to the drum and a relatively movable portion, said fixed portion and said movable portion each having at least one flow control partition opening, said movable portion being adapted to be moved so that the associated said at least one flow control partition opening may be selectively brought into registration with a corresponding said at least one flow control partition opening in the fixed portion so that transfer of composted material between adjacent chambers is permitted and out of registration with a corresponding said at least one flow control partition opening in the fixed portion so that all of the at least one flow control partition opening are fully obstructed, whereby the garden composter may receive organic waste through said load openings for decomposition in said chambers, and the waste may be aged selectively in said chambers to adjust its residence time, as required, before discharge from the composter;

wherein the cylindrical drum has end wall portions formed into respective outwardly extending trunnions for rotation inside respective, receiving cradle openings formed in the support frame, the trunnions having at least one discharge opening formed therein for discharging composted material from the drum;

the support frame having a pair of bearing plates for location against said end wall portions, each bearing plate having a cradle opening for receiving a respective one of said trunnions, and supporting a number of radially disposed roller bearings for rolling engagement with an end wall portion on rotation of the drum.

6. A garden composter according to claim 5 having a closure cap for each said trunnion.

7. A garden composter according to claim 1 in which the said at least one partition is circular and the fixed and movable portions have a number of sector shaped flow control partition openings formed therein, the flow control partition openings being radially offset from each other to leave wall portions in between for closing the flow control partition openings when the handle is brought to said closed limit position.

8. A garden composter according to claim 1 in which the tumbling means consists of a toothed peripheral rim formed at one end of the composting drum for cooperation with a pinion wheel mounted to said support frame.

9. A garden composter for decomposing organic waste, the garden composter having a longitudinally extending cylindrical wall portion extending between two end wall portions about a longitudinal axis, the end wall portions having respective outwardly extending trunnions formed on said longitudinal axis and defining discharge openings in said trunnions, at least two load openings being formed in the cylindrical wall between said end wall portions;

removable closure caps for selectively closing said openings;

at least one partition for dividing the cylindrical drum into a number of chambers disposed side by side along said axis, each chamber communicating with a respective load opening, the said at least one partition having a fixed portion coupled to the drum and a relatively movable portion, said fixed portion and said movable portion each having at least one flow control partition opening, said movable portion being adapted to be moved so that the associated said at least one flow control partition opening may be selectively brought into registration with a corresponding said at least one flow control partition opening in the fixed portion so that transfer of composted material between adjacent chambers is permitted and out of registration with a corresponding said at least one flow control partition opening in the fixed portion so that all of the at least one flow control partition opening in the fixed portion are fully obstructed;

a handle fixed to the movable portion of the partition and extending radially from the cylindrical wall portion for arcuate movement along the cylindrical wall portion of the drum, the drum having an arcuate slot for receiving the handle and disposed to lie in registration with said partition to define open and closed limit positions, in which the flow control partition openings are in registration and fully open and in which the flow control partition openings are out of registration and fully closed, respectively;

a support frame having a pair of bearing plates for location against said end wall portions, each bearing plate having a cradle opening for receiving a respective one of said trunnions, and supporting a number of radially disposed roller bearings for rolling engagement with an end wall, the support frame being adapted to space the drum from a supporting surface;

tumbling means for coupling the drum to the support frame for rotation of the drum relative to the frame about said longitudinal axis, the tumbling means consisting of a toothed peripheral rim formed at one end of the composting drum cooperating with a pinion wheel at one end of a pinion shaft rotatably mounted to the support frame and having a handle for rotation of the pinion shaft, whereby the pinion wheel engages the toothed peripheral rim to rotate the drum and organic waste received through said load openings is decomposed in said chambers, the waste being aged selectively in said chambers to adjust its residence time, as required, before discharge from the composter.

10. A garden composter according to claim 9 in which the said at least one partition is circular and the fixed and movable portions have a number of sector shaped flow control partition openings formed therein, the flow control partition openings being radially offset from each other to leave wall portions in between for closing the flow control partition openings when the handle is brought to said closed limit position.

\* \* \* \* \*